(12) United States Patent
Gaigg et al.

(10) Patent No.: US 11,581,597 B2
(45) Date of Patent: *Feb. 14, 2023

(54) ACCUMULATOR

(71) Applicant: Miba eMobility GmbH, Laakirchen (AT)

(72) Inventors: Stefan Gaigg, Gmunden (AT); Roland Hintringer, Linz (AT)

(73) Assignee: Miba eMobility GmbH, Laakirchen (AT)

(*) Notice: Subject to any disclaimer, the term of this patent is extended or adjusted under 35 U.S.C. 154(b) by 182 days.

This patent is subject to a terminal disclaimer.

(21) Appl. No.: 16/636,113

(22) PCT Filed: Aug. 14, 2018

(86) PCT No.: PCT/AT2018/060190
§ 371 (c)(1),
(2) Date: Feb. 3, 2020

(87) PCT Pub. No.: WO2019/046871
PCT Pub. Date: Mar. 14, 2019

(65) Prior Publication Data
US 2021/0167444 A1 Jun. 3, 2021

(30) Foreign Application Priority Data
Sep. 5, 2017 (AT) .............................. A 50745/2017

(51) Int. Cl.
*H01M 10/6557* (2014.01)
*H01M 10/613* (2014.01)
(Continued)

(52) U.S. Cl.
CPC ..... *H01M 10/6557* (2015.04); *H01M 10/613* (2015.04); *H01M 10/625* (2015.04);
(Continued)

(58) Field of Classification Search
CPC . H01M 10/6555–6557; H01M 10/613; H01M 10/625; H01M 10/643;
(Continued)

(56) References Cited

U.S. PATENT DOCUMENTS 7,291,420 B2  11/2007  Bitsche et al.
8,852,772 B2  10/2014  McDonald
(Continued)

FOREIGN PATENT DOCUMENTS

CN         1745438 A      3/2006
CN     206 353 596 U      7/2017
(Continued)

OTHER PUBLICATIONS

International Search Report in PCT/AT2018/060205, dated Feb. 4, 2019.
(Continued)

*Primary Examiner* — Stewart A Fraser
*Assistant Examiner* — Lilia Nedialkova
(74) *Attorney, Agent, or Firm* — Collard & Roe, P.C.

(57) ABSTRACT

The invention relates to a rechargeable battery (1) comprising several cylindrical cells (2) for storing electrical energy and at least one cooling device (4) for cooling or controlling the temperature of the cells (2), wherein the cooling device (4) has at least one coolant channel (5), at least one coolant inlet (6) and at least one coolant outlet (7), and has at least one single-layer or multi-layer film (8) which is at least partially arranged between the cells (2).

12 Claims, 11 Drawing Sheets

(51) Int. Cl.
  *H01M 10/643* (2014.01)
  *H01M 10/625* (2014.01)
  *H01M 10/6555* (2014.01)

(52) U.S. Cl.
  CPC ..... *H01M 10/643* (2015.04); *H01M 10/6555* (2015.04); *H01M 2220/20* (2013.01)

(58) Field of Classification Search
  CPC ..... H01M 2220/20; A61P 13/12; A61P 19/02; A61P 25/00; A61P 25/16; A61P 25/18; A61P 25/28; A61P 27/02; A61P 29/00; A61P 3/06; A61P 3/10; A61P 35/00; A61P 43/00; A61P 7/06; A61P 9/00; A61P 9/02; A61P 9/10; A61P 9/12; C07K 16/44; C12Q 1/6876; C12Q 1/6883; C12Q 1/6886; C12Q 2600/112; C12Q 2600/142; Y02E 60/10
  See application file for complete search history.

(56) References Cited

U.S. PATENT DOCUMENTS

| | | | |
|---|---|---|---|
| 8,889,282 | B2 | 11/2014 | Goesmann et al. |
| 8,962,172 | B2 | 2/2015 | Bolze et al. |
| 9,546,827 | B2 | 1/2017 | Ludwig et al. |
| 9,559,387 | B2 | 1/2017 | Obrist et al. |
| 2002/0177035 | A1 | 11/2002 | Oweis et al. |
| 2004/0004461 | A1 | 1/2004 | Hamada et al. |
| 2005/0089750 | A1* | 4/2005 | Ng ............... H01M 10/6557 429/120 |
| 2007/0037050 | A1 | 2/2007 | Rigobert et al. |
| 2008/0179315 | A1 | 7/2008 | Suzuki et al. |
| 2008/0311468 | A1 | 12/2008 | Hermann et al. |
| 2011/0304297 | A1* | 12/2011 | Sohn ............... H01M 10/6556 320/107 |
| 2012/0107635 | A1 | 5/2012 | Hirsch et al. |
| 2012/0231313 | A1 | 9/2012 | Kumar et al. |
| 2013/0122331 | A1 | 5/2013 | McDonald |
| 2016/0233561 | A1 | 8/2016 | Lee |
| 2016/0233564 | A1* | 8/2016 | Rinker ............... B60L 58/26 |
| 2017/0104252 | A1 | 4/2017 | Wuensche et al. |
| 2017/0200926 | A1 | 7/2017 | Motokawa et al. |
| 2017/0338532 | A1* | 11/2017 | Mott ............... H01M 10/659 |
| 2018/0151929 | A1 | 5/2018 | Song et al. |
| 2018/0238632 | A1 | 8/2018 | Jia et al. |

FOREIGN PATENT DOCUMENTS

| | | |
|---|---|---|
| DE | 9012327 U1 | 11/1990 |
| DE | 100 34 134 A1 | 1/2002 |
| DE | 10 2008 053 311 A1 | 4/2009 |
| DE | 10 2008 034 867 A1 | 1/2010 |
| DE | 10 2008 059 970 A1 | 6/2010 |
| DE | 10 2010 032 460 A1 | 2/2012 |
| DE | 10 2011 075 820 A1 | 11/2012 |
| DE | 10 2011 118 686 A1 | 5/2013 |
| DE | 10 2013 220 044 A1 | 4/2015 |
| DE | 10 2013 221 747 A1 | 4/2015 |
| DE | 10 2013 021 553 A1 | 6/2015 |
| DE | 10 2015 204 678 A1 | 9/2016 |
| EP | 1 261 065 A2 | 11/2002 |
| EP | 2 451 004 A1 | 5/2012 |
| EP | 2 744 033 A1 | 6/2014 |
| FR | 2 782 399 A1 | 2/2000 |
| FR | 3013515 A1 | 5/2015 |
| JP | 2006-271063 A | 10/2006 |
| JP | 2014-078471 A | 5/2014 |
| WO | 2010/012341 A1 | 2/2010 |
| WO | 2010/108885 A1 | 9/2010 |
| WO | 2011/088997 A1 | 7/2011 |
| WO | 2012/062644 A1 | 5/2012 |
| WO | 2012/072348 A1 | 6/2012 |
| WO | 2017/015826 A1 | 2/2017 |
| WO | 2017/108581 A1 | 6/2017 |

OTHER PUBLICATIONS

International Search Report in PCT/AT2018/060190, dated Nov. 29, 2018.

International Search Report in PCT/AT2018/060204, dated Feb. 4, 2019.

* cited by examiner

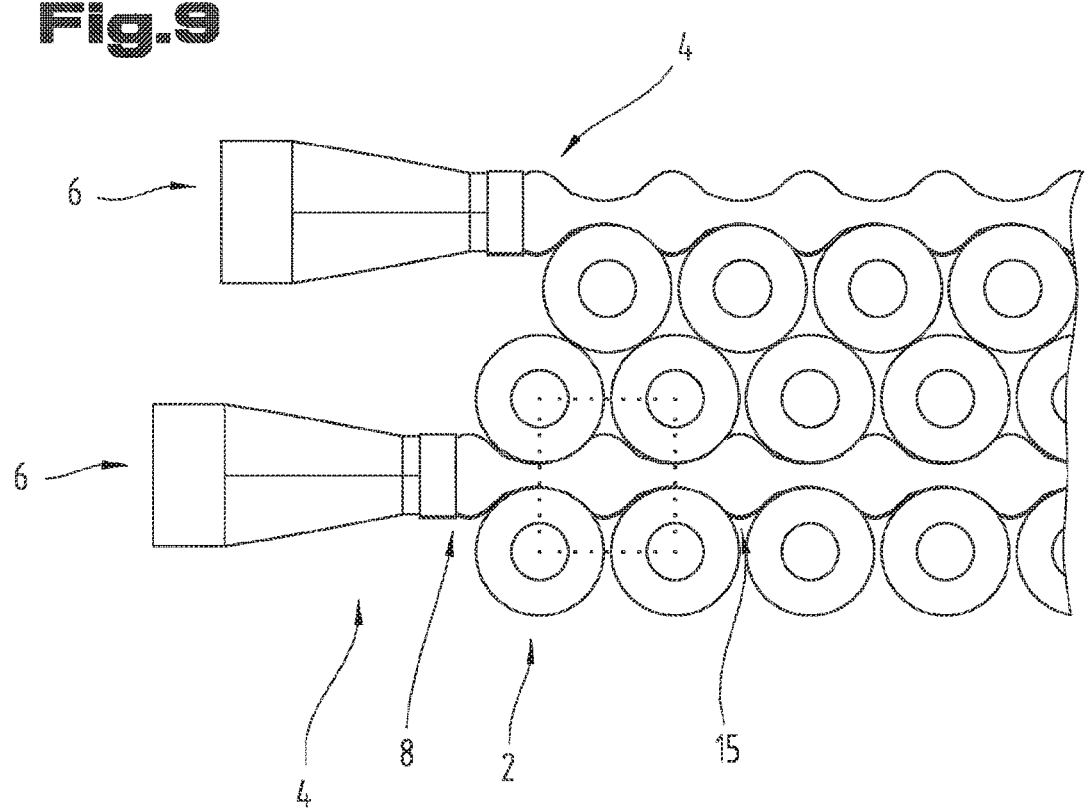
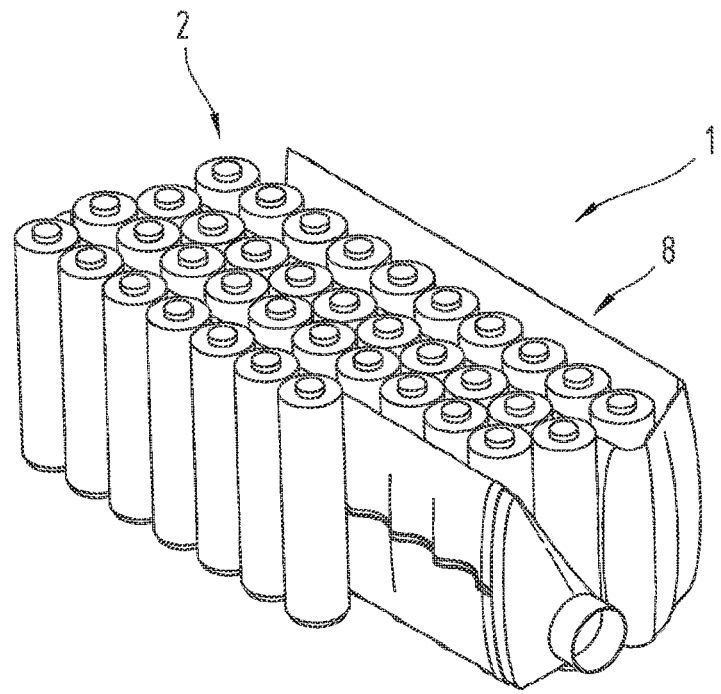

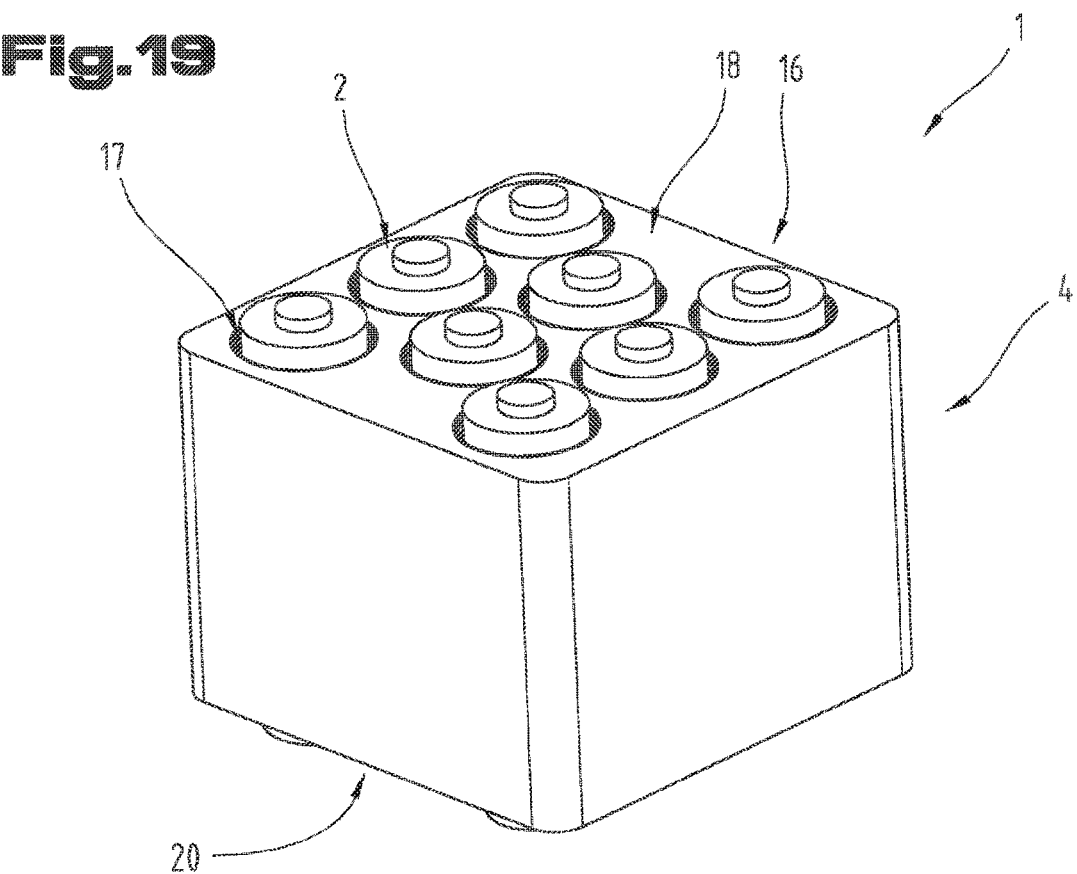
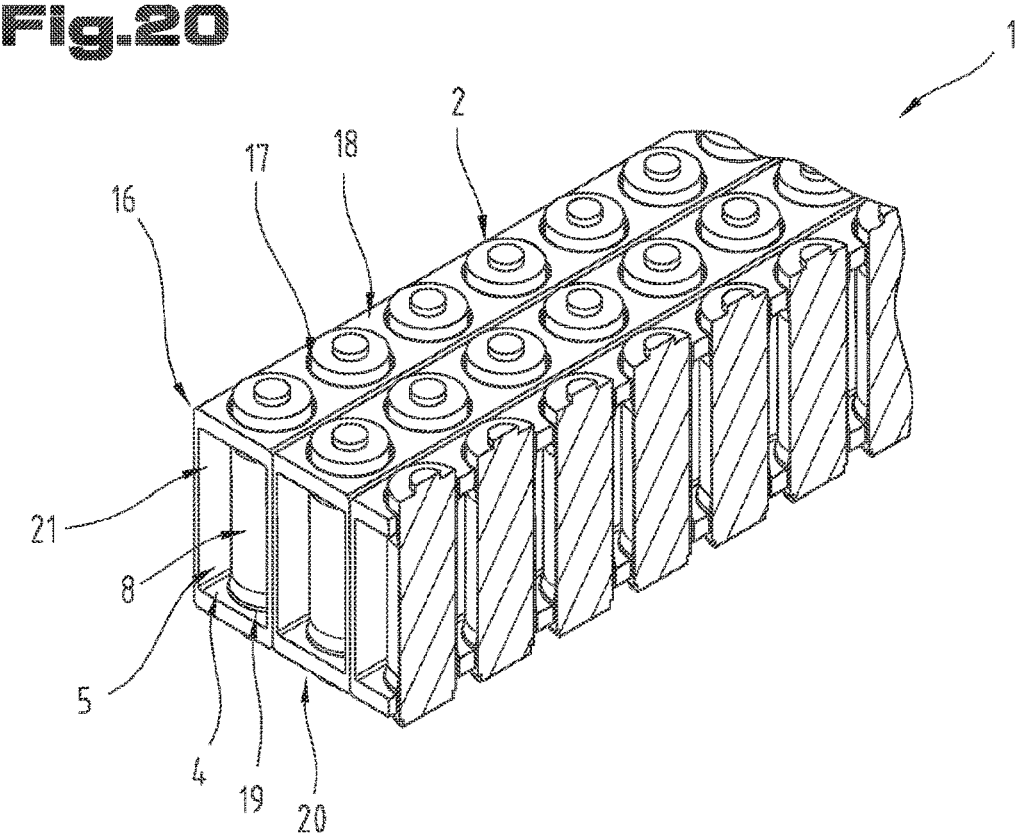

ACCUMULATOR

CROSS REFERENCE TO RELATED APPLICATIONS

This application is the National Stage of PCT/AT2018/060190 filed on Aug. 14, 2018, which claims priority under 35 U.S.C. § 119 of Austrian Application No. A 50745/2017 filed on Sep. 5, 2017, the disclosure of which is incorporated by reference. The international application under PCT article 21(2) was not published in English.

BACKGROUND OF THE INVENTION

1. Field of the Invention

The invention relates to a rechargeable battery with several cylindrical cells for storing electrical energy and at least one cooling device for cooling or controlling the temperature of the cells, wherein the cooling device comprises at least one coolant channel, at least one coolant inlet and at least one coolant outlet.

2. Description of the Related Art

The service life and effectiveness as well as the safety of a rechargeable battery, i.e. of an accumulator, for e-mobility depend, among other factors, on the temperature during operation. For this reason, various concepts have been suggested for the cooling and/or temperature control of the rechargeable batteries. These concepts can be divided into essentially two types, namely air cooling and water cooling and/or in general cooling with liquids.

For water cooling, cooling bodies in which at least one coolant channel is formed are used. These cooling bodies are arranged between the individual modules of the rechargeable battery or on the modules. In this regard, a module is an individual unit of the rechargeable battery, i.e. not just a cell.

The cooling of individual cells is problematic if these are designed cylindrically. However, the cylindrical cell is the most widespread cell form, as it can be produced easily, is mechanically very stable and achieves the largest energy density as compared to other forms. The 18650 cell, which has a diameter of 18 mm and a height of 65 mm, is a standard. The cell chemistry is integrated in a stable round housing in this cell. However, due to its shape it has a bad heat dissipation.

SUMMARY OF THE INVENTION

The present invention is based on the object of creating a structurally simple cooling option and/or temperature control option for rechargeable batteries with cylindrical cells.

In the aforementioned rechargeable battery, the object of the invention is achieved in that the cooling device comprises a single-layer or multi-layer film, which is at least partly arranged between the cells.

The advantage of this is that due to the flexibility of the film, the space between the cells of a cell module with several cells can better and/or more easily be used for cooling and/or controlling the temperature of the cells. The film can, without further measures (such as the application of leveling compounds) having to be implemented, lie against the cells with a larger surface, which thus allows for a more efficient heat transfer into and out of the cells. Moreover, the film can serve to achieve a reduction of weight, whereby the effectiveness of the energy supply, for example for e-mobility, can be improved through longer working periods of the rechargeable battery and, thus, for example higher ranges of an electric vehicle.

Where, below, for the purpose of simplification merely the term "cooling" is used, the term "temperature control" should be read as well. Temperature control of the rechargeable battery is also covered by the term "cooling" within the meaning of the invention.

According to an embodiment variant of the rechargeable battery, it can be provided for that the cooling device comprises a self-supporting housing in which recesses are arranged with the cells being arranged in said recesses, wherein single-layer or multi-layer films are arranged between two opposite recesses in each case, and in particular between the housing and the cells, and are connected to the housing. Hence, the cooling device can be provided with an increased stability such that additional holders for the cells can be dispensed with. Moreover, hence, improved cooling of the rechargeable battery can be achieved if the housing at least partially consists of a metal, because part of the heat can be removed via the metal by heat conduction.

According to an embodiment variant in this regard, it can be provided for that the recesses in the housing have a diameter which is larger as compared to an outer diameter of the cells, such that the films are at least partly designed to be at least approximately conically. This conical shape facilitates the insertion of the cells into the cooling device, whereby machine production of the rechargeable battery can be improved.

According to another embodiment variant, it can be provided for that the cooling device comprises a further single-layer or multi-layer film, wherein the film and the further film are connected to one another forming the at least one coolant channel between the film and the further film. The advantage of this is that the cooling device is simply constructed of and/or consists of two film materials connected to one another. An additional arrangement and/or an additional incorporation of the coolant channel can be dispensed with since it is automatically created by the partial connection of the two film materials. The production of the cooling device can be carried out mainly automatically, while as regards the geometry of the cooling device and the concrete design of the at least one coolant channel there are merely very little restrictions as well.

According to a further embodiment variant, the film can consist of a laminate comprising a first plastic film, an enforcement layer connected thereto, a metal film connected to the enforcement layer or a metalized further plastic film connected to the enforcement layer. By means of the enforcement layer, an improved stiffness and stability can be achieved at the operating temperature of the rechargeable battery. Moreover, it became apparent that this film has a lower creeping tendency. The film thus further has a reduced thermal expansion, which leads to less stresses in the cooling device in case of temperature changes. By means of the metal film and/or the metalized further plastic film, a better heat distribution across the surface of the cooling device is achieved, whereby its efficiency can be improved. By the better heat distribution due to the improved thermal conductivity of the film, moreover, hotspots can be better prevented during operation of the cooling device. Besides this, the cooling device can hence be provided with a barrier function.

The further film can also comprise at least one second plastic film, which is partially connected to the first plastic film of the laminate of the film in connection areas, such that between the connection areas at least one cavity is formed, which forms the at least one coolant channel. This can serve to further simplify the production of the cooling device.

For the aforementioned reasons regarding the laminate of the film, according to a further embodiment variant it can be provided for that the further film also consists of a laminate comprising the second plastic film, an enforcement layer connected thereto, a metal film connected to the enforcement layer of a metalized further plastic film connected to the enforcement layer.

It can also be provided for that the enforcement layer comprises a fiber reinforcement. With the fiber reinforcement, the coefficient of thermal expansion of the enforcement element can be reduced and be approximated to the value of the films. Thus, the heat transfer element can have fewer residual stresses and a lower tendency to warp.

In this regard, according to an embodiment variant, the fiber reinforcement can be formed of a woven fabric, whereby a further improvement of the mechanical behavior of the cooling device can be achieved.

It is also possible that the first plastic film and/or the second plastic film and/or the metalized further plastic film consists/consist of a plastic material that is selected from a group consisting of PE, POM, PA, PPS, PET, cross-linked polyolefins, thermoplastic elastomers on ether basis/ester basis, styrene block copolymers, silicone elastomers. These plastic materials have proved to be particularly advantageous for use in producing the cooling device with a higher degree of automation due to the improved extrusion capability.

To increase the cooling performance, it can be provided for that in the direction towards the cells several films are arranged on top of one another and several cooling channels are formed between these films. In this regard, the use of the film and optionally of the further film proves to be advantageous, since hence despite the higher cooling performance, a lower weight of the cooling device can be achieved.

Between the several films arranged on top of one another, according to a further embodiment variant of the rechargeable battery, a fiber layer can be arranged, whereby a further weight reduction can be achieved, in particular if according to an embodiment variant it is provided for that the coolant channel or the coolant channels is or are at least partially formed in the fiber layer.

According to another embodiment variant of the rechargeable battery, it can be provided for that the outlet and/or the inlet is formed by a distancing element between the film and the further film. Thus, a better separation of the films of the cooling device in the region of the at least one coolant channel at least in the region of the inlet and/or outlet can be achieved, while at the same time an improved leakproofness of the cooling device in these regions can be achieved more easily.

According to a further embodiment variant of the rechargeable battery, improved cooling of the cells can be achieved if the cooling channel is arranged to extend spirally.

It is advantageous regarding the simplicity of the design, the cooling performance and the arrangement possibilities between the cells if according to an embodiment variant of the rechargeable battery, it is provided for that the cooling device is designed to be hose-shaped.

BRIEF DESCRIPTION OF THE DRAWINGS

For the purpose of better understanding of the invention, it will be elucidated in more detail by means of the figures below.

These respectively show in a simplified schematic representation:

FIG. 9 a cutout of the embodiment variant of the arrangement of the cooling device in the rechargeable battery according to FIG. 8 in a top view;

FIG. 10 a third embodiment variant of the arrangement of a cooling device in the rechargeable battery in an oblique view;

FIG. 19 An eighth embodiment variant of the arrangement of a cooling device in the rechargeable battery in an oblique view;

FIG. 20 a cutout from a ninth embodiment variant of the arrangement of a cooling device in the rechargeable battery in an oblique view;

DETAILED DESCRIPTION OF THE PREFERRED EMBODIMENTS

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure and in case of a change of position, these specifications of location are to be analogously transferred to the new position.

The following statements can be applied to all embodiment variants of the invention if nothing else results from the description or from the drawings.

Figure 1:
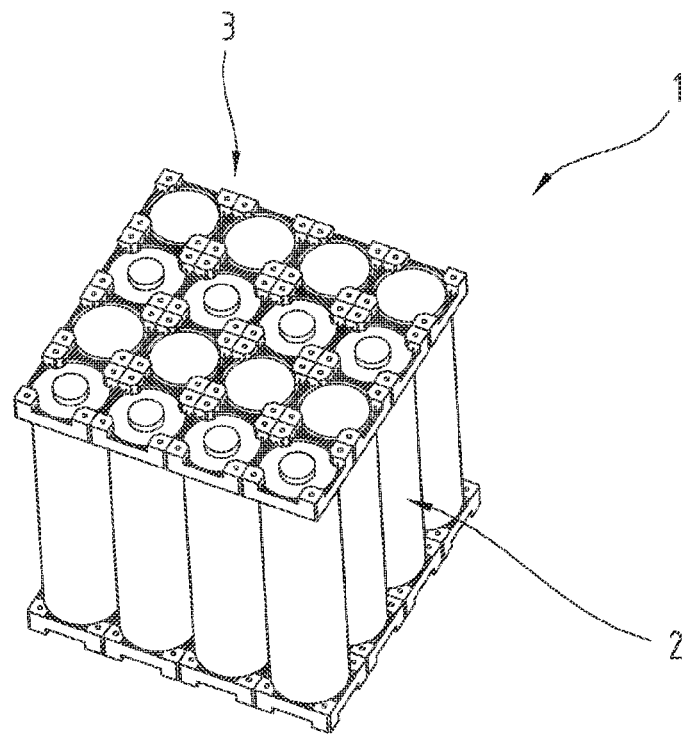
FIG. 1 a rechargeable battery in an oblique top view.

FIG. 1 shows a rechargeable battery 1, i.e. an accumulator, in an oblique view. The rechargeable battery comprises several cells 2 having a cylindrical shape. In this embodiment variant of the rechargeable battery, the cells 2 are held in position by at least one frame element 3. The at least one frame element 3 comprises breakthroughs through which the cells are stuck.

In the specific example represented, an upper and a lower frame element 3 are provided. However, it is also possible that there is one frame element 3 only.

It should be noted at this point already that the number of cells 2 in the represented embodiment variants of the rechargeable battery 1 is not to be understood to limit the scope of protection.

Moreover, several cells 2 can be consolidated to one cell module. For example, the rechargeable battery 1 shown in FIG. 1 can be such a module. Several ones of these modules can subsequently be installed in a rechargeable battery 1 in order to increase its performance capacity.

The cells 2 serve the purpose of storing the electrical energy. For this purpose, they have a corresponding structure. For example, a cell can have a layering of films comprising the anode, the cathode and a separator, as is per se known. In this respect, reference is made to the relevant prior art.

The cells 2 can be arranged differently in the rechargeable battery 1 and/or in the cell module.

Figure 2:
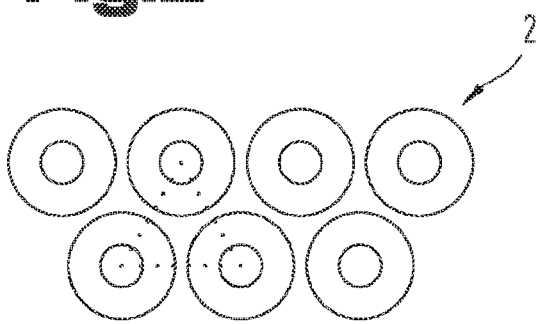
FIG. 2 a first arrangement of cells in the rechargeable battery in a top view.
Figure 3:
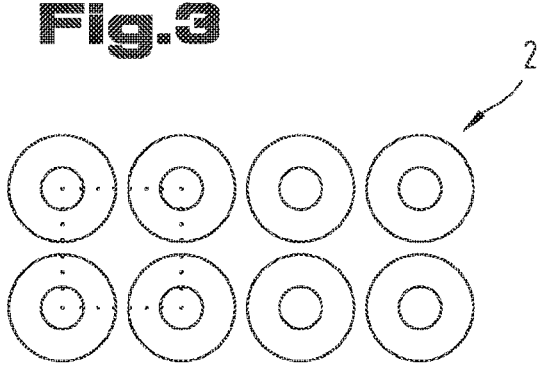
FIG. 3 a second arrangement of cells in the rechargeable battery in a top view.
Figure 4:
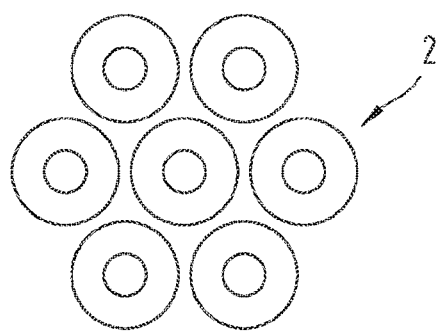
FIG. 4 a third arrangement of cells in the rechargeable battery in a top view.

Three embodiment variants are shown in FIGS. 2 to 4. For example, the cells 2 can be arranged in rows, wherein every second row is offset by approximately half a cell width (=diameter of the cell). The cells of every second row are thus arranged in the gaps of the respective adjacent cell rows, as is shown in FIG. 2. The cells 2 are arranged in a triangular grid of equilateral triangles. Such a triangle is adumbrated in dashed lines in FIG. 2.

However, the non-offset embodiment variant, as shown in FIG. 3, is also possible. Here, the cells 2 are arranged in a grid of squares, as is also adumbrated in dashed lines.

FIG. 4 shows an arrangement in which a central cell 2 is surrounded by six cells 2 forming a hexagonal shape.

The rechargeable battery 1 is not limited to these represented patterns of the arrangement of the cells 2.

Figure 5:
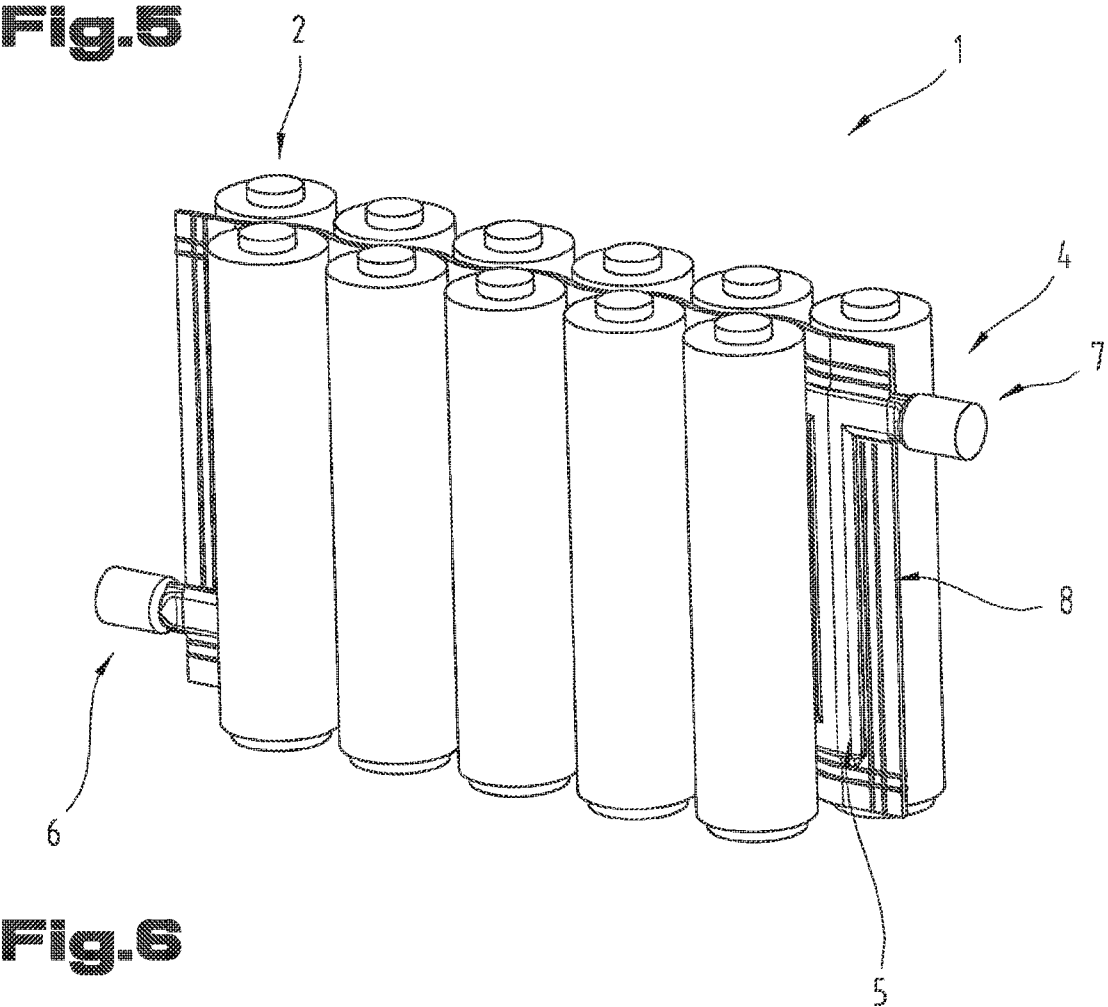
FIG. 5 a first embodiment variant of the arrangement of a cooling device in the rechargeable battery in an oblique view.
Figure 6:
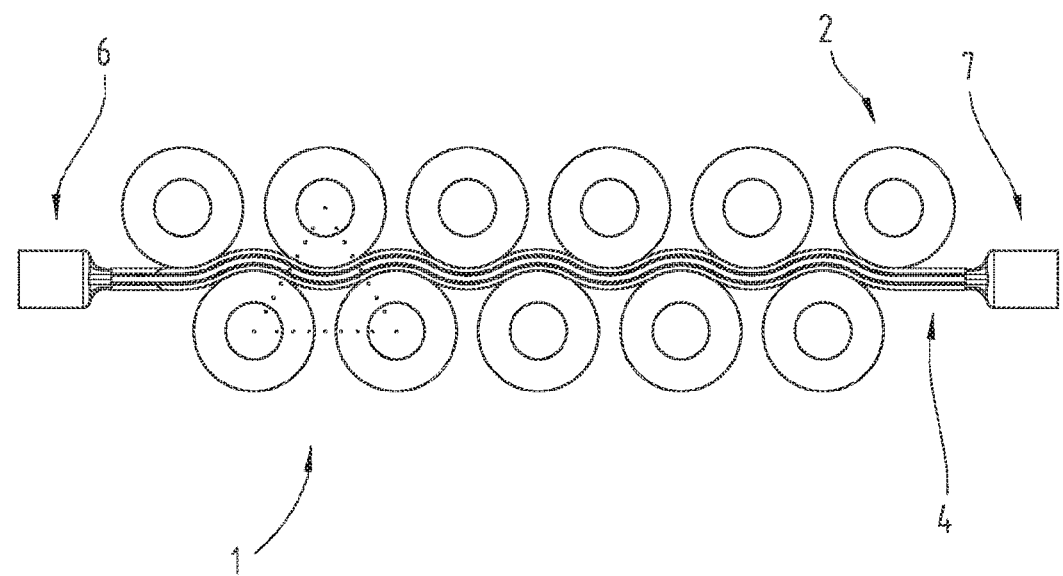
FIG. 6 the embodiment variant of the arrangement of the cooling device in the rechargeable battery according to FIG. 5 in a top view.

The rechargeable battery further comprises at least one cooling device 4 (it is also possible that more than one cooling device 4 is arranged in the rechargeable battery) for cooling or controlling the temperature of the cells 2, as is shown by means of a first embodiment variant of the arrangement of this cooling device 4 in the rechargeable battery 1 in FIGS. 5 and 6.

The cooling device 4 comprises at least one coolant channel 5, at least one coolant inlet 6 and at least one coolant outlet 7. Via the coolant inlet 6, a liquid coolant, for example a glycol-water mixture, is inserted into the coolant channel 5, and discharged by means of the coolant outlet 7. The cooling device 4 is integrated in a corresponding coolant circuit, which is not shown here in further detail.

The cooling device 4 comprises at least one single-layer or multi-layer film 8, which is at least partially arranged between the cells 2 and forms the coolant channel 5.

Due to the flexibility of the film 8, the cooling device 4 can better be placed in the spaces between the cells 2 and simultaneously better lie against the surface of the cells 2, in particular lie against it directly, as can particularly be seen from FIG. 6. As the film 8 is flexible, i.e. not stiff, said film 8 can better adapt to surface irregularities of the cells 2 or between the cells 2. Moreover, hence, the expansion of the cells 2 through increase of temperature can be allowed for more easily. A leveling compound between the cooling device 4 and the cells 2 is not required. Hence, heat transmission from the cells 2 into the cooling device 4 can be improved.

Moreover, hence, the expansion of the cells 2 through increase of temperature can be allowed for more easily. A leveling compound between the cooling device 4 and the cells 2 is not required. Hence, heat transmission from the cells 2 into the cooling device 4 can be improved.

In this embodiment variant, the cooling device 4 extends approximately linearly (except for the waviness caused by the contact to the cells 2) between two rows of cells 2. Since the rows are offset to one another (see explanations regarding FIG. 2), the contact of the film 8 to the cells 2 takes place in turns, meaning that, in turns, one side of the film 8 lies against the cells 2 of the first row and the second side lies against the cells 2 of the second row in the longitudinal extent of the cooling device 4. If more rows of cells 2 are arranged in the rechargeable battery 1, more than one cooling device 4 can be arranged as well, as is partially shown in the further figures.

As can particularly be seen from FIG. 5, the cooling device 4 preferably extends across at least approximately the entire height of the cells 2.

Depending on the number of cells 2 in the rows, the cooling device 4 has an at least approximately rectangular shape (as in FIGS. 5 and 6) or an at least approximately square shape.

The coolant inlet 6 and/or the coolant outlet 7 can be formed as pipe sockets, i.e. cylindrically. In particular, they consist of a plastic material, which is connected to the film 8, in particular in a materially bonded manner, for example welded or glued.

The coolant channel 5 is formed by the film 8 itself. For this purpose, a layer of film can be "folded" and the open sides along the side edges of the film parts lying on top of one another can be connected in a materially bonded manner. However, it is also possible that two (or more) film cuts are placed on top of one another and connected to one another in a materially bonded manner on all sides forming connection areas, for example weld seams 9, as can be seen from FIG. 7. The connection areas are discontinued in the areas in which the coolant inlet 6 and the coolant outlet 7 are arranged.

If needed, more than one connection area, for example more than one weld seam 9, can be arranged and/or formed per side edge of the film 8, in order to provide the cooling device 4 with a higher safety against leakage.

Figure 7:
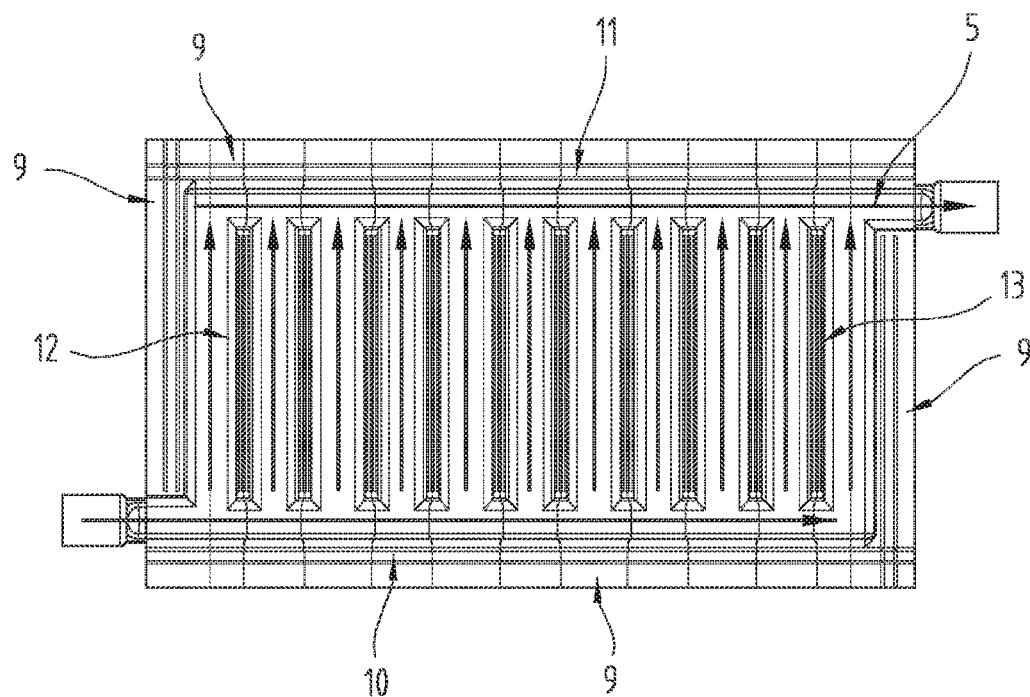
FIG. 7 the cooling device of the rechargeable battery according to FIG. 5 in a side view.

The coolant channel 5 can, in the simplest case, be formed as an unbranched, straight channel However, it is also possible to adapt the flow path to the respective circumstances as desired. In FIG. 7, for example, a first coolant channel section 10 and a second coolant channel section 11 extend at least approximately in parallel to one another. The two coolant channel sections 10, 11 are connected to one another by several coolant channel sections 12 oriented perpendicularly to these. The entering coolant is thus separated to several partial streams and is again unified to one coolant stream after having ran through the coolant channel sections 12.

In general, the coolant channel 5 can also be formed to extend in meandering manner.

Here as well, the use of at least one film 8 for the cooling device 4 proves to be advantageous, since the specific design of the coolant channel 5 can easily be established by the arrangement of further connection areas, in particular further weld seams 13, and can in particular be carried out simultaneously with the production of the connection areas along the side edges, i.e. for example the weld seams 9.

It should be noted that the specific extent of the coolant channel 5 shown in FIG. 7 is not to be understood as limitation to the scope of protection.

The cooling device 4 can also have more than one coolant inlet 6, more than one coolant outlet 7 and more than one coolant channel 5.

In the further figures, further and optionally independent embodiment variants of the rechargeable battery 1 are shown, wherein again, equal reference numbers and/or component designations are used for equal parts as for FIGS. 1 to 7. In order to avoid unnecessary repetitions, it is pointed to/reference is made to the detailed description regarding FIGS. 1 to 7.

Figure 8:
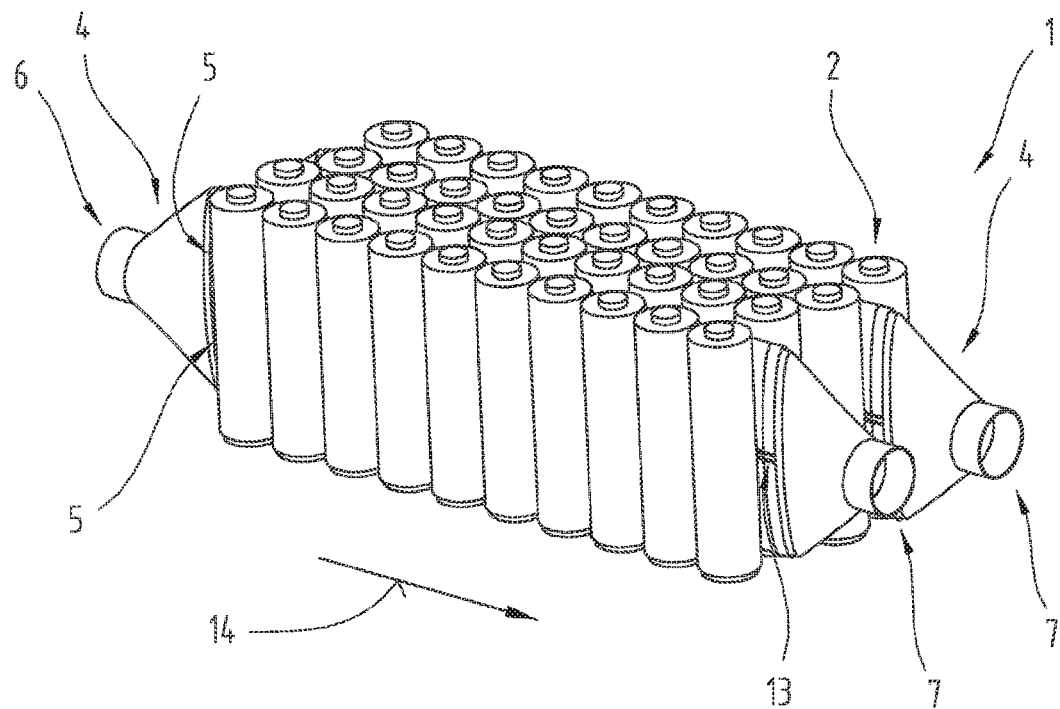
FIG. 8 a second embodiment variant of the arrangement of a cooling device in the rechargeable battery in an oblique view.

As stated above, the rechargeable battery 1 can also have more than one cooling device 4. As an example, FIGS. 8 and 9 show a rechargeable battery 1 which has two cooling devices 4 arranged next to one another, each cooling device 4 being assigned to two rows of cells 2.

In contrast to the above-mentioned embodiment variant of the rechargeable battery 1, here, the cooling device 4 is hose-shaped. It is possible that just one coolant channel 5 is formed between the coolant inlet 6 and the coolant outlet 7. However, it is also possible that more than one coolant channel 5 is formed, for example two, as is adumbrated with a weld seam 13 in FIG. 8. The two coolant channels 5 extend in parallel to one another in a flow direction 14 of the coolant.

The coolant inlets 6 and the coolant outlets 7 are at least partly formed to be funnel-shaped, which allows for the distribution of the coolant onto the available cross-sectional area can take place more quickly. Essentially, the two cooling devices 4 thus look approximately tubularly.

It can be seen from FIG. 9 that the cooling device 4 has widenings 15 in the region between the cells. This can, in turn, be achieved due to the flexibility of the film 8. Due to these widenings 15, the two cooling devices 4 lie against the cells 2 with a larger surface.

It can further be seen from FIGS. 8 and 9 that, in each case, two rows of cells between which one cooling device 4 is arranged in each case, have no offset, meaning that the cells are arranged on a square grid, as was stated regarding FIG. 3. Units of two rows of cells 2 and the cooling device 4 arranged between these formed therefrom can, however, be offset by approximately half a diameter of the cells 2 (the two middle rows of cells 2 in FIG. 8.

The term "approximately" in the context of an offset of approximately half a cell diameter refers to the circumstance that the cells 2 in the rechargeable battery 1 are spaced apart from one another and this distance thus has to be considered when offsetting the rows.

Figure 11:
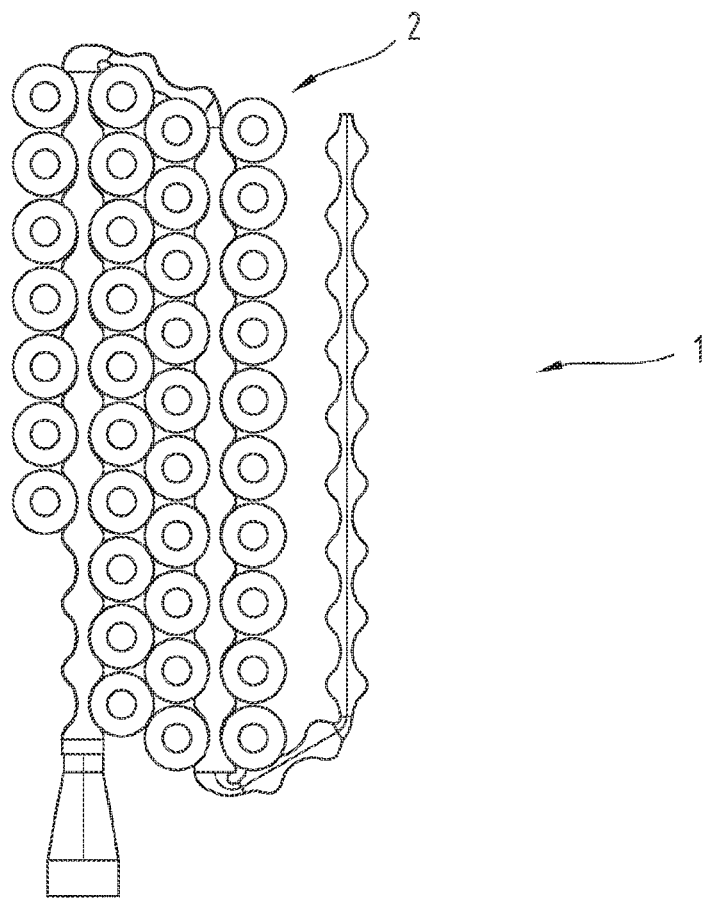
FIG. 11 the embodiment variant of the arrangement of the cooling device in the rechargeable battery according to FIG. 10 in a top view.

FIGS. 10 and 11 serve to demonstrate that it is also possible that a rechargeable battery 1 having more than two rows of cells 2 is equipped with merely one cooling device 4. Since the film 8 is flexible, it is possible to place it between the cells 2 in a snake-like manner. The cooling device 4 can also be positioned at least approximately in a U-shape.

Such designs with just one cooling device 4 serving for cooling more than two rows of cells 2 have the advantage that hence the number of required coolant inlets 6 and coolant outlets 7 can be reduced.

For the sake of completeness, it should be stated that the cooling device 4 can be formed to be hose-shaped in this embodiment variant of the rechargeable battery 1 as well.

Figure 12:
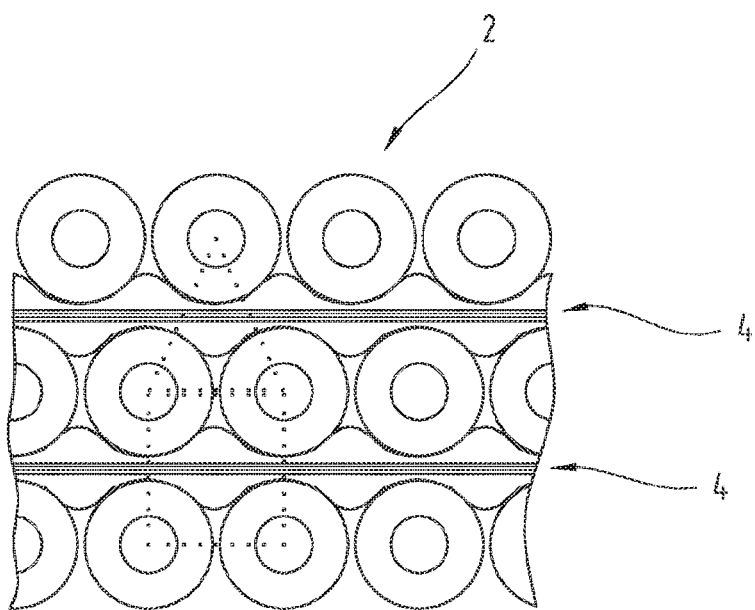
FIG. 12 a cutout from a fourth embodiment variant of the arrangement of a cooling device in the rechargeable battery in a top view.

FIG. 12 shows that it is possible to the arranged the or a cooling device 4 between each row of cells 2. In this regard, it is also possible that the cells 2 are arranged in a square grid and in a triangle grid, as is adumbrated in dashed lines in FIG. 12. However, from a fluidics point of view, the triangle grid is preferred.

In all embodiment variants described above, the cooling device 4 or the cooling devices 4 can be positioned flexibly. The designs are not limited to a specific number of cells or to a specific length of the cooling device 4, since the latter can be designed as desired.

Figure 13:
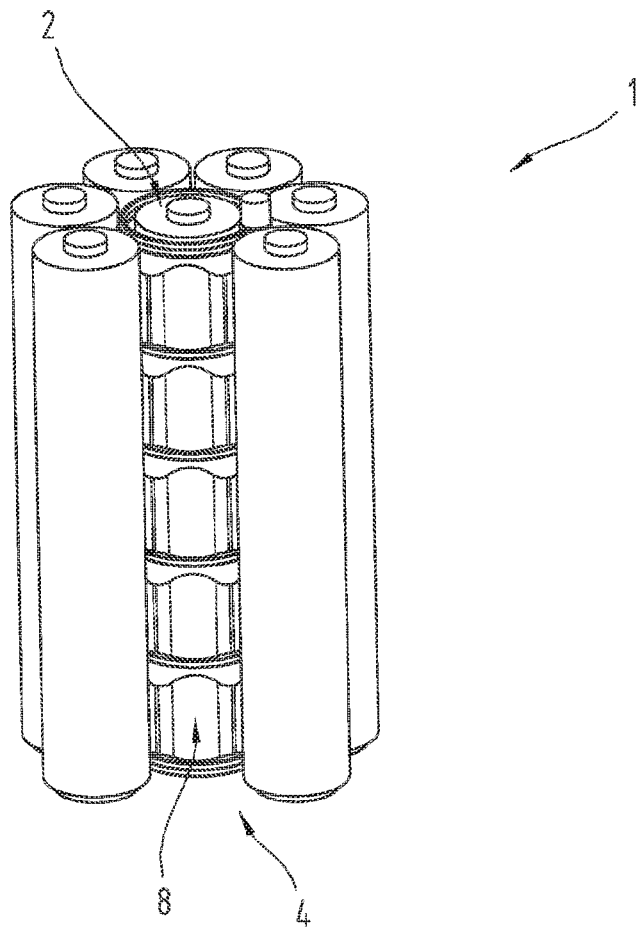
FIG. 13 a fifth embodiment variant of the arrangement of a cooling device in the rechargeable battery in an oblique view.

FIG. 13 shows a design of the rechargeable battery 1 in which a central cell 2 is surrounded by seven cells 2 in a shape. To free the view onto the cooling device 4 lying between the central cell 2 and the outer cells 2, the seventh outer cell is not shown in FIG. 13.

In this embodiment variant, two hose-shaped cooling devices 4 are combined with one another by the two hoses being connected to one another, in particular in a materially bonded manner, for example by means of welding. Hence, a single hose is created by means of which it is possible to cool the central cell 2 on the one hand and to prevent that the central cell 2 cools down too much on the other hand. For this purpose, for example, the film surface and/or the film type of the film 8 used can additionally be adapted correspondingly.

Figure 14:
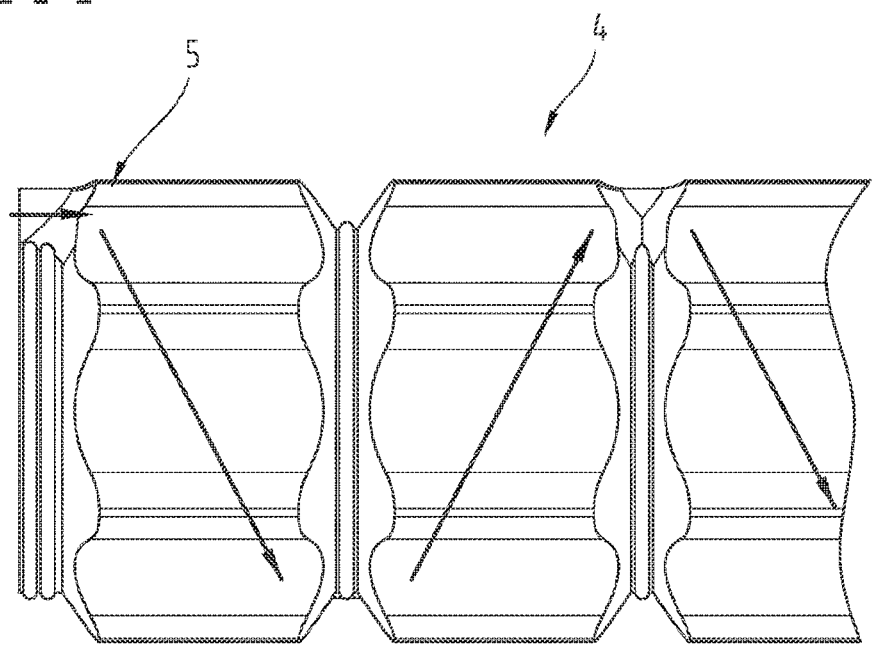
FIG. 14 a cutout of the cooling device of the rechargeable battery according to FIG. 13 in a side view.

The design of the coolant channel 5 can, in turn, be designed variably. For example, it can be formed such through the further connection areas of the films 8, in particular the weld seams 13, that the coolant runs through the cooling device 4 in a zig-zag, as is adumbrated in FIG. 14.

Figure 15:
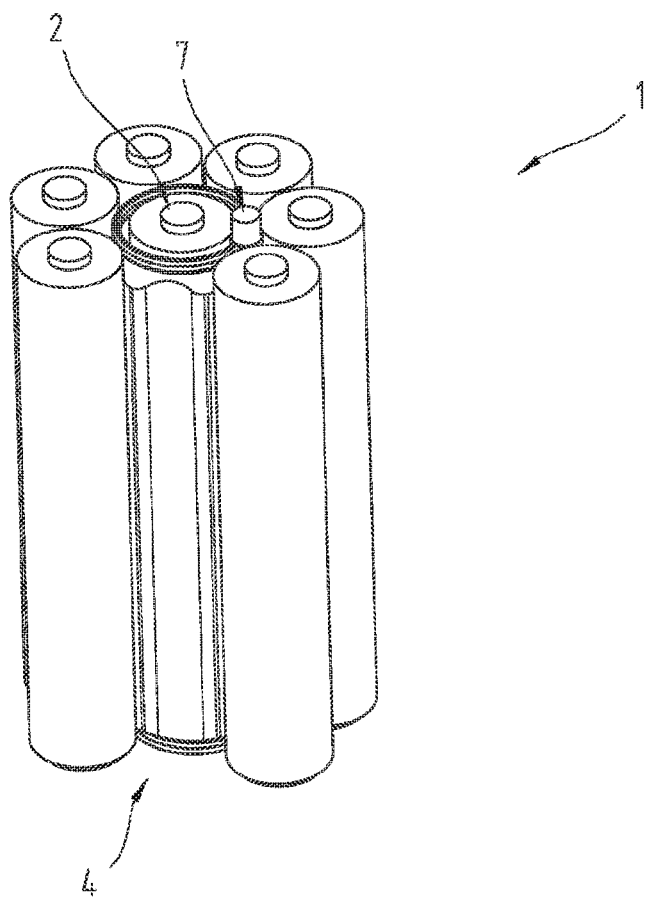
FIG. 15 a sixth embodiment variant of the arrangement of a cooling device in the rechargeable battery in an oblique view.
Figure 16:
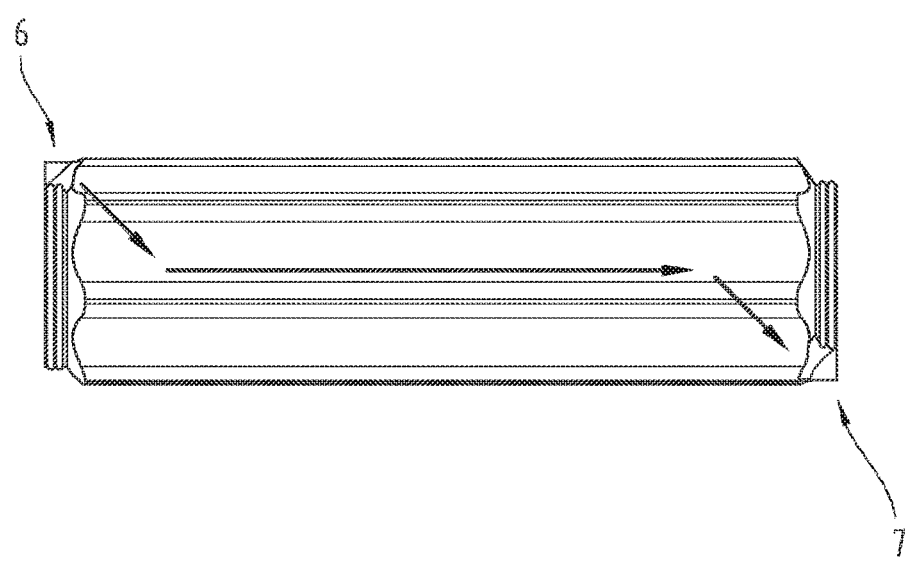
FIG. 16 the cooling device of the rechargeable battery according to FIG. 15 in a side view.

However, it is also possible that the coolant at least approximately flows in the direction of the height of the cells 2, as is illustrated by means of FIGS. 15 and 16. In this regard, a deflection of the flow can take place merely in the region of the coolant inlet 6 and/or of the coolant outlet 7. By the deflection, turbulences can be generated to make optimum use of the coolant. Such turbulences can alternatively or additionally also be achieved by correspondingly high inlet flow rates.

Figure 17:
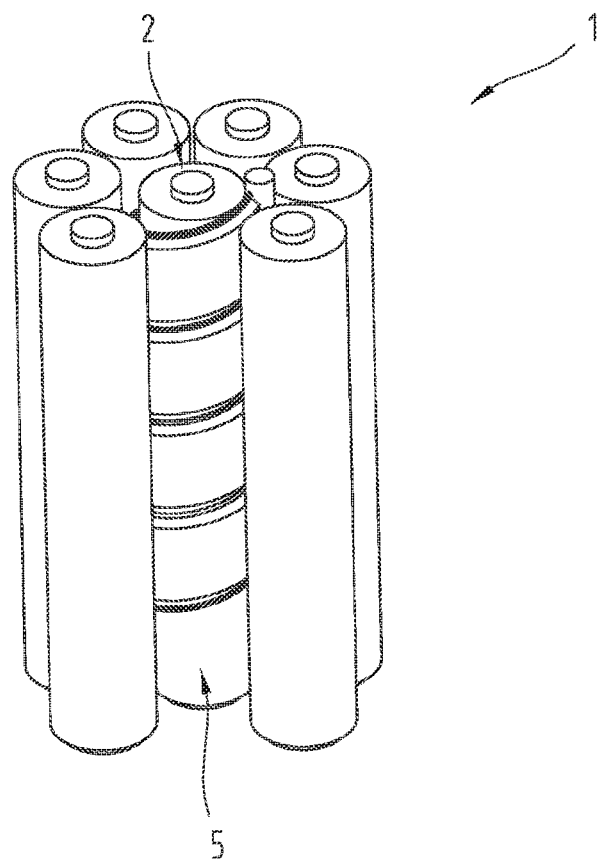
FIG. 17 a cutout from a seventh embodiment variant of the arrangement of a cooling device in the rechargeable battery in an oblique view.
Figure 18:
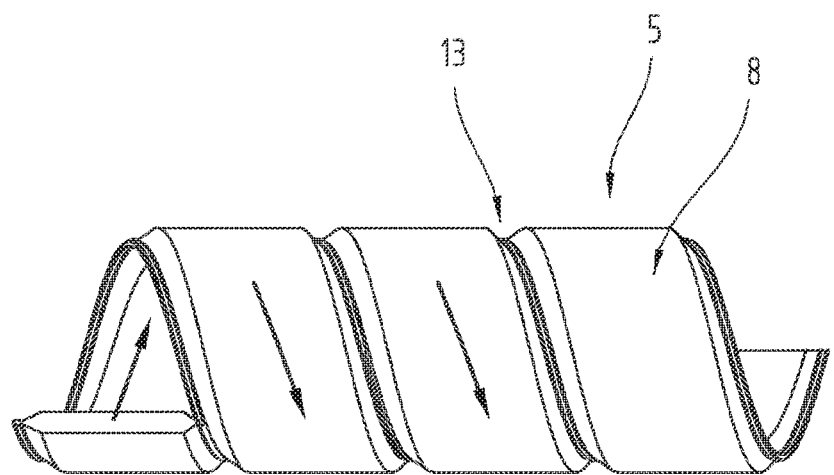
FIG. 18 the cooling device of the rechargeable battery according to FIG. 17 in a side view.

Besides the represented extents of the coolant channel 5, it should be illustrated by means of FIGS. 17 and 18 that it can also extend differently than shown, in particular spirally. This spiral extent can also either be generated by a corresponding arrangement of a hose-shaped cooling device 4 or by a corresponding formation of connection areas, in particular the weld seams 13 in the film 8.

In the embodiment variants of the rechargeable battery 1 according to FIGS. 19 to 22, it comprises a self-supporting housing 16 which is part of the cooling device 4. In the housing 16, recesses and/or breakthroughs 17 are arranged and/or formed in a cover part 18 and recesses and/or breakthroughs 19 are arranged and/or formed in a base part 20. The cells 2 are stuck in the and/or through the recesses and/or breakthroughs 17 in the cover part 18 and in the and/or through the recesses and/or breakthroughs 19 in the base part 20, wherein the cells 2 are arranged to project over the cooling device 4 at the top and the bottom as in the other embodiment variants of the rechargeable battery 1. The housing 16 can hence replace the at least one frame element 3 according to FIG. 1.

The recesses and/or breakthroughs 17, 19 are adapted to the cross-sectional shape of the cells 2, i.e. in particular circular in cross-section.

It should be noted that the cooling device 4 is partially shown in a sectional view in FIG. 20 to free the view into the inside of the cooling device 4.

The housing 16 preferably at least partly consists of an optionally fiber reinforced plastic material, in particular a hard plastic material, or of a metal, for example aluminum or an aluminum alloy.

Between two recesses opposite to one another in the direction of the height of the cells 2, i.e. for example a breakthrough 17 in the cover part 18 and a breakthrough 19 in the base part 20, in each case, single-layer or multi-layer films 8 are arranged and connected, in particular welded or glued, to the housing 16. Preferably, the films 8 also extend into the recesses and/or breakthroughs 17, 19, in particular across the entire height of these recesses and/or breakthroughs 17, 19 in the direction of the longitudinal extent of the cells 2, and are connected to the side walls of the recesses and/or breakthroughs 17, 19, as can be seen from FIGS. 21 and 22.

In these embodiment variants of the rechargeable battery 1, the films 8 merely represent a membrane by means of which an interior 21 of the housing 16, which is closed except for at least one inlet and outlet for the coolant, is separated from the cells 2. The interior 21 itself of the housing 16 forms the coolant channel 5 of the cooling device 4. The housing 16 is thus entirely flown through by the liquid coolant. The fluid pressure during operation presses the films 8 against the cells 2, which allows for correspondingly good cooling of the cells 2 to be achieved.

Figure 21:
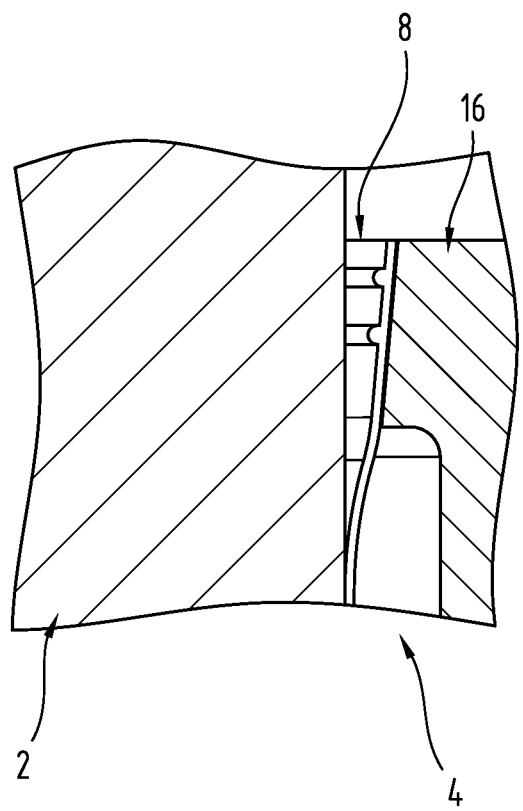
FIG. 21 a detail from a tenth embodiment variant of the rechargeable battery.
Figure 22:
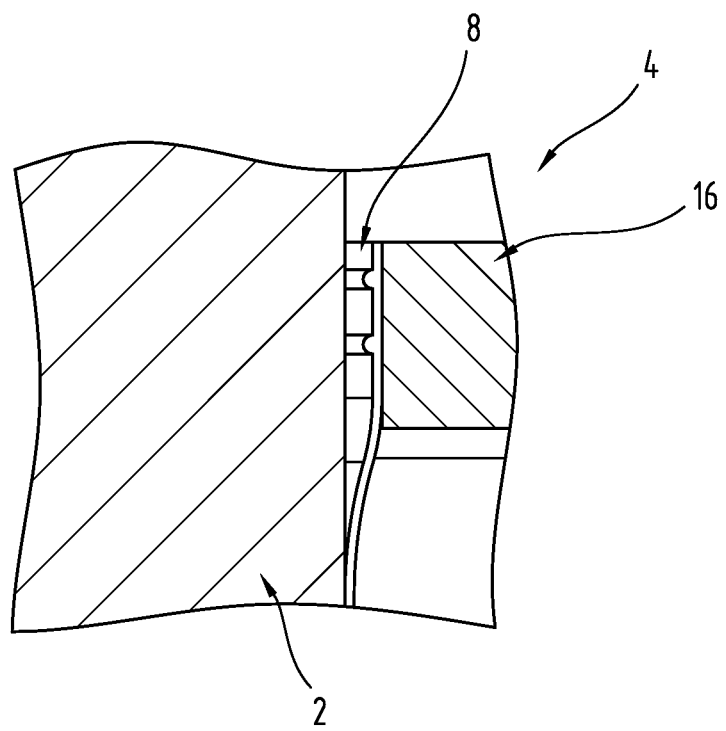
FIG. 22 a detail from an eleventh embodiment variant of the rechargeable battery.

As can be seen from FIGS. 21 and 22, according to an embodiment variant in this regard, it can be provided for that the recesses in the housing 16 have a diameter that is larger as compared to an outer diameter of the cells 2, such that the films 8 are arranged at a distance to the cells 2 in this area. These areas can at least partly be formed to be approximately conical (FIG. 21) or cylindrical (FIG. 22). The conical design is cheaper to produce, while the cylindrical design is a space-optimized embodiment variant.

Figure 23:
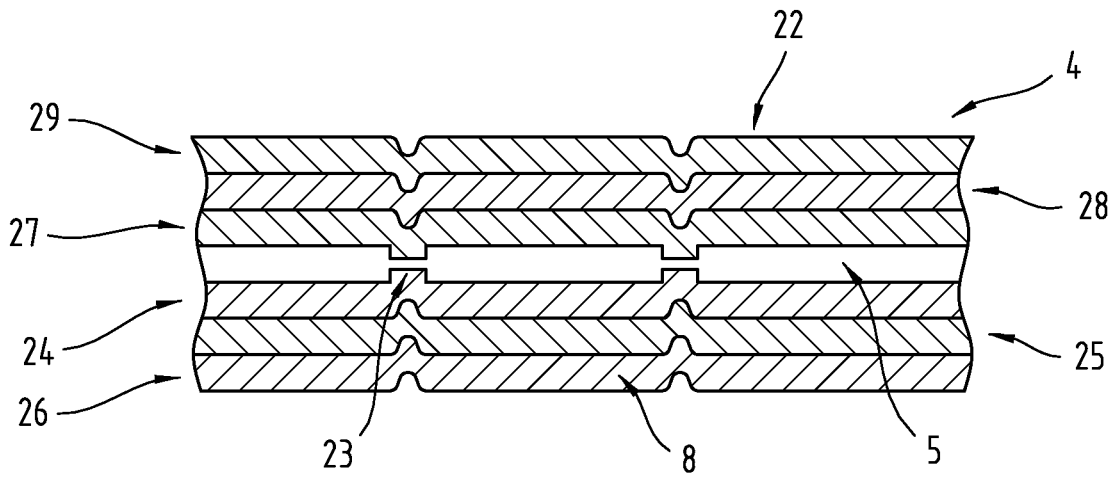
FIG. 23 a cutout from another embodiment variant of the cooling device.

FIG. 23 shows a cutout of an embodiment variant of the cooling device 4 in cross-section.

It should be noted at this point that the cooling device 4 of the following embodiment variants and/or the film 8 and/or further film described below can also be used in the embodiment variants of the rechargeable battery 1 presented above. To illustrate this, it should be mentioned by way of example that the film 8 in the rechargeable battery according to FIG. 5, as described below, can be composed and optionally be connected to a further film, as described below.

However, it should also be noted that the film 8 of the embodiment variants of the rechargeable battery 1 according to FIGS. 1 to 22 can also be structured and/or composed differently than described below.

The cooling device 4 comprises the film 8 and a further single-layer or multi-layer film 22. The film 8 and the further film 22 are connected to one another in connection areas 23 forming the at least one coolant channel 5 between the film 8 and the further film 22. Unconnected areas, in which the at least one coolant channel 5 is formed by the spacing of the film 8 from the further film 22, remain between the connection areas 23. The film 8 and the further film 22, which is in particular arranged above the film 8, as in the embodiment variants of the rechargeable battery 1 without the housing 16 described above, preferably extend across a surface which preferably at least approximately, in particular to 100%, corresponds to the surface of the cooling device 4 (as viewed in a plan view).

In this embodiment variant of the cooling device 4, the film 8 consists of a laminate comprising a first plastic film 24, an enforcement layer 25 connected thereto, a metal film 26 connected to the enforcement layer 25 or a metalized further plastic film connected to the enforcement layer 25.

The at least one coolant channel 5 is, as in the embodiment variants of the rechargeable battery 1 without the housing 16 described above, not formed by separate components but by the just partial connection of the films, i.e. in this embodiment variant of the film 8 to the further film 22. The wall and/or the walls of the at least one coolant channel 5 are thus formed by the film 8 and the further film 22, preferably half by each.

Preferably, the further film 22 comprises at least one second plastic film 27 and/or consists thereof. The second plastic film 27 is partially connected to the first plastic film 24 of the laminate of the film 8 in connection areas 23 such that between the connection areas 23 at least one cavity is formed which forms the at least one coolant channel 5.

It can further be provided for that according to an embodiment variant in this regard, the further film 22 also consists of a laminate comprising the second plastic film 27, an enforcement layer 28 connected thereto, a metal film 29 connected to the enforcement layer 28 or a metalized further plastic film connected to the enforcement layer 28.

In general, other laminates can be used as well. For example, merely the film 8 can be provided with the metal film 26 or merely the further film 22 can be provided with the metal film 29. Likewise, merely the film 8 can comprise the enforcement layer 25 or merely the further film 22 can comprise the enforcement layer 28. Structures of the film 8 and/or the further film 22 with more than three layers are possible. However, preferably, the film 8 and the further film 22 are designed equally.

The enforcement layer 28 and/or the metal film 29 of the further film 22 can differ from the enforcement layer 25 and/or the metal film 26 of the film 8. However, preferably, the two enforcement layers 25, 28 and/or the two metal films 26, 29 are designed equally.

The two films 8, 22 are arranged such that the two plastic films 24, 27 lie against one another and the mentioned partial connected is formed via these plastic films 24, 27. If the further film 22 comprises (merely) the second plastic film 27, said second plastic film 27 is arranged directly adjacent to the plastic film 24 of the film 8 and connected thereto.

Instead of a metal film 26, 29, metalized further plastic films can also be used, while in this case the metalization is preferably arranged between the enforcement layer 25, 28 and the further plastic film.

The first plastic film 24 and/or the second plastic film 27 and/or the metalized further plastic film preferably consists/ consist to at least 80 wt. %, in particular at least 90 wt. % or at least 100 wt. %, of a thermoplastic material or of an elastomer. The thermoplastic material can be selected from a group comprising and/or consisting of polyethylene (PE), polyoxymethylene (POM), polyamide (PA), in particular PA 6, PA 66, PA 11, PA 12, PA 610, PA 612, polyphenylene sulphide (PPS), polyethylene terephthalate (PET), cross-linked polyolefins, preferably polypropylene (PP). The elastomer can be selected from a group comprising and/or consisting of thermoplastic elastomers such as thermoplastic vulcanizates, olefin-, amine-, ester-based thermoplastic polyurethanes, in particular ether-based/ester-based thermoplastic elastomers, styrene block copolymers, silicone elastomers.

At this point, it should be noted that the term plastic material is understood as a synthetic or natural polymer produced from corresponding monomers.

Preferably, the first plastic film 24 and/or the second plastic film 27 and/or the metalized further plastic film consists/consist of a so-called sealing film. This has the advantage that the respective films can be connected to one another directly.

However, it is also possible to use other plastic materials, such as thermosetting plastic materials and/or thermosetting materials, which are then for example adhered to one another by means of an adhesive. Two-part adhesive systems based on polyurethane or silicone or hot melt adhesive systems are particularly suitable for this purpose.

Preferably, the enforcement layer/enforcement layers 25, 28 comprise/comprises a or consist/consists of a fiber reinforcement.

The fiber reinforcement is preferably formed as a separate layer, which is arranged between the plastic film 24 and/or the plastic film 27 and the metal film 26 and/or the metal film 29 or the metalized further plastic film. If cavities are formed in the fiber reinforcement, these can also be at least partially filled with the plastic material of the plastic film 24 and/or the plastic film 27 or the metalized further plastic film.

The fiber reinforcement can be formed of fibers and/or threads, which are selected from a group comprising or consisting of glass fibers, aramid fibers, carbon fibers, mineral fibers such as basalt fibers, natural fibers such as hemp, sisal and combinations thereof.

Preferably, glass fibers are used as fiber reinforcement. The proportion of the fibers, in particular the glass fibers, in the fiber reinforcement can amount to at least 80 wt. %, in particular at least 90 wt. %. Preferably, the fibers and/or threads of the fiber reinforcement consist merely of glass fibers.

The fibers and/or threads can be present in the fiber reinforcement as roving, for example as a non-woven fabric. However, preferably the fibers and/or threads become a woven fabric or a knitted fabric. In this regard, it is also possible that the woven or knitted fabric is merely present in some regions and that the remaining regions of the fiber reinforcement are formed by a roving.

It is also possible that rubberized fibers and/or threads are used as or for the fiber reinforcement.

When using a woven fabric, different types of weaves are possible, in particular plain, twill or satin weave. Preferably, a plain weave is used.

However, it is also possible to use an open-mesh glass fabric or glass roving.

The fiber reinforcement can be formed as a single layer. However, it is also possible that the fiber reinforcement comprises several, optionally separate, individual layers, for example two or three, wherein at least individual or several individual layers can at least in some regions, preferably entirely, consist of fibers and/or threads different as compared to the rest of the individual layers.

In the alternative or in addition to the fiber reinforcement, the enforcement layer(s) 25, 28 can comprise a mineral filling. For example, calcium carbonate, talc, quartz, wollastonite, kaolin or mica can be used as a mineral filling (mineral filler material).

The metal film 26, 29 in particular is an aluminum film. However, other materials such as copper or silver can also be used.

The metal film 26, 29 can have a layer thickness of between 5 μm and 100 μm.

In case of the use of the metalized further plastic film, the mentioned metals can be used for the metalization. Preferably, the metalization has a layer thickness selected from a range of between 5 nm and 100 nm. The metal vapor deposition of the further plastic film can be carried out by means of a method known from the prior art.

The plastic film 24 and/or the plastic film 27 and/or the further plastic film, which comprise the metalization, can have a layer thickness of between 10 μm and 200 μm.

The layer thickness of the enforcement layer(s) 25, 28 can amount to between 5 μm and 50 μm.

The film 8 and/or the further film 22 can in particular comprise the following structure in the indicated order:
 plastic film 24 and/or plastic film 27 of PP;
 enforcement layer 25, 28 of a glass fiber fabric;
 metal film 26, 29 of aluminum with a layer thickness of 12 μm.

In case of the further film 22 consisting merely of the plastic film 27, preferably a polyethylene terephthalate (PET) is used as the plastic material for it.

The film 8 and/or the further film 22 can also comprise at least one further layer, such as at least one further enforcement layer and/or at least one primer layer and/or at least one thermotropic layer.

Although the film 8 and the further film 22, if it also is a film laminate, can in general be used in the form of individual films for producing the cooling device 4, such that the film laminate(s) are only formed in the course of the production of the cooling device 4, it is advantageous if the first film 8 and/or the further film 22 are used as a (laminated) semi-finished product.

For connecting the individual layers of the laminate or the laminates, these can be adhered to one another by means of adhesives. The afore-mentioned adhesives are suitable for this purpose. Besides adhesives, coextrusion and extrusion coating can also be used as joining options. Of course, a combination is also possible in which several plastic materials are coextruded and adhesively laminated to one another with an extrusion-coated metal or (fiber) enforcement layer. In general, all known methods can be used for producing composite films and/or film laminates.

According to a further embodiment variant, it can be provided for that the cooling device 4 comprises at least one additional film, which is partially connected to the film 8 or to the further film 22, as was described above with respect to the connection of the film 8 to the further film 22. The coolant channels 5 can hence be arranged in at least two planes on top of one another, wherein in this case they are preferably not formed congruently but to be laterally offset with respect to one another in the manner described above and/or in the way to be described. In this case, it is advantageous if the film 8 or the further film 22 comprises the plastic film 24 or the plastic film 27 on both outer sides (surfaces), such that via these the connection with the additional films can be established, i.e. in particular again two sealing films can be connected to one another.

Figure 24:
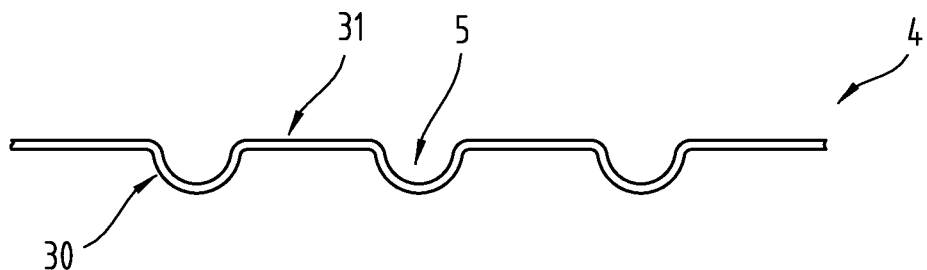
FIG. 24 a cutout from a further embodiment variant of the cooling device.

FIG. 24 shows a cutout of another embodiment variant of the cooling device 4. Therein, a fiber layer 30, for example of a paper, is arranged between the plastic film 24 and the plastic film 27 (both represented in FIG. 23). This fiber layer 30 is designed to be liquid resistant. For this purpose, a coating 31 can be provided on the surfaces that come into contact with the coolant. However, it is also possible that the fibers of the paper and/or of the fiber layer 30 are per se designed to be liquid proof, for example coated.

The coating 31 moreover has another function as well. In the fiber layer 30, the at least one coolant channel 5 is provided, for example by means of embossing or another shaping process. In order to be able to maintain the shape when the rechargeable battery 1 and/or the cooling device 4 is operated, the fiber layer 30 can be provided an increased solidity and/or stiffness by means of the coating 31.

The coating 31 can for example be a cured adhesive layer.

Figure 25:
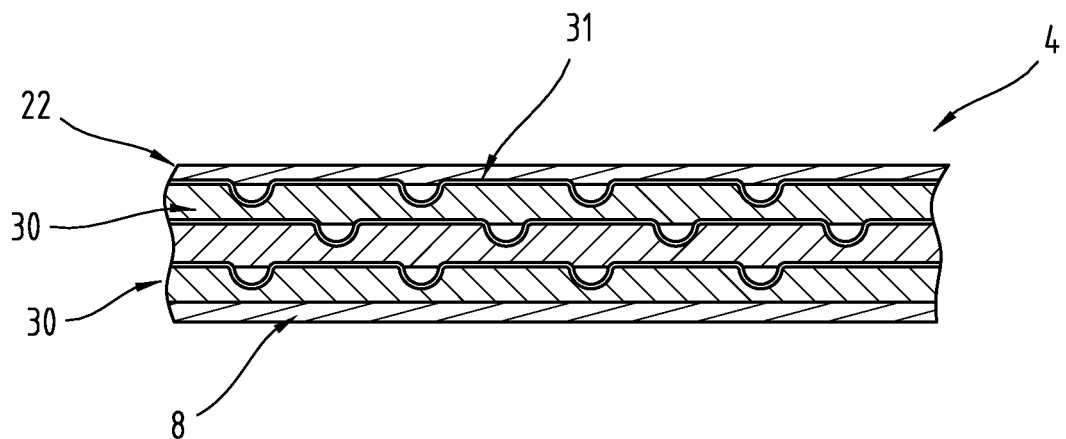
FIG. 25 a cutout from an embodiment variant of the cooling device with several cooling planes on top of one another.

So as to further reduce the weight of the rechargeable battery 1 and/or the cooling device 2, according to a further embodiment variant shown in FIG. 25, it can be provided for that several ones of these fiber layers 30 provided with the coating 31 are arranged between the film 8 and the further film 22 so as to be located one above the other, in particular directly one above the other.

The film 8 and/or the further film 22 can be designed as individual films or as laminates in these embodiment variants of the cooling device 4 as well.

In the preferred embodiment variant of the cooling device 4, it also comprises corresponding connecting elements (coolant inlet 6, coolant outlet 7) for the connection of the inlet line and the outlet line for the coolant. In general, these can be designed as common connecting elements as are known from the prior art. However, in the preferred embodiment variant, these connecting elements are also at least partially, in particular entirely, made from a plastic material, wherein the aforementioned plastic materials can be used as plastic materials.

According to another embodiment variant of the rechargeable battery 1, it can be provided for that the coolant outlet 7 and/or the coolant inlet 6 is formed by a distancing element (not shown) between the film 8 and the further film 22. Preferably, the distancing elements are also made from a plastic material. It is further preferred if via the distancing elements the leakproofness of the connections of the cooling device 4 for the coolant is improved.

In this context, it should be noted that the specific placement of the coolant inlet 6 and the coolant outlet 7 depends on the specific design of the at least one coolant channel 5.

The aforementioned collecting channels for the coolant can, just as the at least one coolant channel 5, be produced by means of the just partial connection of the film 8 to the further film 22. In this regard, reference is made to the corresponding explanations above.

The described partial connection of the film 4 to the further film 22 and/or an additional film and/or two plastic films 24, 27 of the laminates can be established in a laminating press. In this regard, the connection can be established by the effect of an increased temperature and an increased pressure, as is known from laminating and/or heat sealing. The specific temperature depends on the used plastic materials.

Instead of the laminating device, a press can also be used, especially for the production of long fiber reinforced films 8, 22 and/or a long fiber reinforced cooling device 4. At this, the fibers are impregnated and pressed with the plastic material, which results in the fiber reinforced film material.

For a higher degree of customizability of the cooling device 4 at a high degree of automation, it can be provided for that a welding robot is used for the connection. Hence, the connection areas 23 (FIG. 23) can be determined and programmed individually such that the arrangement and/or formation of the at least one coolant channel 5 can be adapted to individual requirements very flexibly.

In the two mentioned methods for producing the cooling device 4, the connection of the films 8, 22 to one another and/or the of the film 8 to the housing 16 is established in a materially bonded manner either by welding or adhering, while mixed variants of these methods are also possible. In general, other methods can be used for this purpose as well.

For example, temperature pulse welding, laser welding, IR welding, ultrasonic welding, highfrequency welding can be used as welding methods.

In general, it should be noted that in case of more than one coolant channel 5 in the cooling device 4, it can be advantageous if a common inlet is arranged in front of the several coolant channels 5 and a common outlet behind them, which can each be formed as collecting channels, from which the coolant channels branch out or into which they flow. However, it is also possible that each coolant channel 5 has its own coolant inlet 6 and/or its own coolant outlet 7.

Further, the coolant inlet 6 and the coolant outlet 7 can be arranged on one side of the cooling device 4. However, the coolant inlet 6 and the coolant outlet 7 can also be arranged and/or formed on and/or in different sides of the cooling device 4.

For the (automatic) insertion of the cells 2 into the cooling device 4 with the housing 16, a negative pressure can be generated therein, whereby the film 8 is pulled into the housing 16.

The rechargeable battery 1 can be used in diverse fields, such as in the motor vehicles (e-mobility), in airplanes, etc. Depending on the application, several rechargeable battery 1 can be combined to one.

The exemplary embodiments show possible embodiment variants of the rechargeable battery 1, while it should be noted at this point that combinations of the individual embodiment variants are also possible.

Finally, as a matter of form, it should be noted that for ease of understanding of the structure of the rechargeable battery 1 and/or the cooling device 2, these are not obligatorily depicted to scale.

LIST OF REFERENCE NUMBERS 1 rechargeable battery
2 cell
3 frame element
4 cooling device
5 coolant channel
6 coolant inlet
7 coolant outlet
8 film
9 weld seam
10 coolant channel section
11 coolant channel section
12 coolant channel section
13 weld seam
14 flow direction
15 widening
16 housing
17 breakthrough
18 cover part
19 breakthrough
20 base part
21 interior
22 film
31 coating 23 connection area
24 plastic film
25 enforcement layer
26 metal film
27 plastic film
28 enforcement layer
29 metal film
30 fiber layer

The invention claimed is:

1. A rechargeable battery comprising:
several cylindrical cells for storing electrical energy and
at least one cooling device for cooling or controlling the temperature of the cells,
wherein the cooling device has at least one coolant channel, at least one coolant inlet and at least one coolant outlet,
wherein the cooling device has at least one multi-layer film which is at least partially arranged between the cells,
wherein the at least one multi-layer film comprises a first laminate comprising a first plastic film, an enforcement layer connected thereto, a metal film connected to the enforcement layer or a metalized further plastic film connected to the enforcement layer,
wherein the enforcement layer of the first laminate is arranged between the first plastic film of the first laminate and the metal film or the metalized further plastic film of the first laminate,
wherein the cooling device comprises a further multi-layer film,
wherein the at least one multi-layer film and the further multi-layer film are connected to one another forming the at least one coolant channel between the at least one multi-layer film and the further multi-layer film,
wherein the further multi-layer film comprises at least one second plastic film, which is partially connected to the first plastic film of the first laminate in connection areas, such that between the connection areas at least one cavity is formed, which forms the at least one coolant channel,
wherein the further multi-layer film comprises a second laminate comprising the at least one second plastic film, an enforcement layer connected thereto, a metal film connected to the enforcement layer or a metalized further plastic film connected to the enforcement layer,
wherein the enforcement layer of the second laminate is arranged between the first plastic film of the first laminate and the metal film or the metallized further plastic film of the second laminate, and
wherein the at least one multi-layer film and the further multi-layer film are arranged such that the first plastic film and the second plastic film lie against one another forming a partial connection via the first plastic film and the second plastic film.

2. The rechargeable battery according to claim 1, wherein the enforcement layer of the first laminate comprises a fiber reinforcement.

3. The rechargeable battery according to claim 2, wherein the fiber reinforcement is formed by a woven fabric.

4. The rechargeable battery according to claim 1, wherein at least one of the first plastic film, the second plastic film, the metalized further plastic film of the first laminate and the metalized further plastic film of the second laminate comprises a plastic material that is selected from a group consisting of polyethylene (PE), polyoxymethylene (POM), polyamide (PA), polyphenylene sulfide (PPS), polyethylene terephthalate (PET), cross-linked polyolefins, thermoplastic elastomers on ether basis/ester basis, styrene block copolymers, silicone elastomers.

5. The rechargeable battery according to claim 1, wherein the coolant outlet and/or the coolant inlet is formed by a distancing element between the at least one multi-layer film and the further multi-layer film.

6. The rechargeable battery according to claim 1, wherein in a direction towards the cells several films are arranged on top of one another and several coolant channels are formed between these films.

7. The rechargeable battery according to claim 6, wherein a fiber layer is arranged between the several films arranged on top of one another.

8. The rechargeable battery according to claim 7, wherein the coolant channels are at least partially formed in the fiber layer.

9. The rechargeable battery according to claim 1, wherein the coolant channel is arranged to extend spirally.

10. The rechargeable battery according to claim 1, wherein the cooling device is formed to be hose-shaped.

11. The rechargeable battery according to claim 1, wherein the enforcement layer of the second laminate comprises a fiber reinforcement.

12. The rechargeable battery according to claim 11, wherein the fiber reinforcement is formed by a woven fabric.

* * * * *